Nov. 19, 1963  G. STAVIS  3,111,663
RADAR AND TELEVISION NAVIGATION AID
Filed Nov. 7, 1960  4 Sheets-Sheet 1

INVENTOR.
GUS STAVIS
BY *H. A. Mackey*
ATTORNEY.

Nov. 19, 1963

G. STAVIS 3,111,663

RADAR AND TELEVISION NAVIGATION AID

Filed Nov. 7, 1960

INVENTOR.
GUS STAVIS

BY *H. A. Mackey*

ATTORNEY.

Nov. 19, 1963   G. STAVIS   3,111,663
RADAR AND TELEVISION NAVIGATION AID
Filed Nov. 7, 1960   4 Sheets-Sheet 3
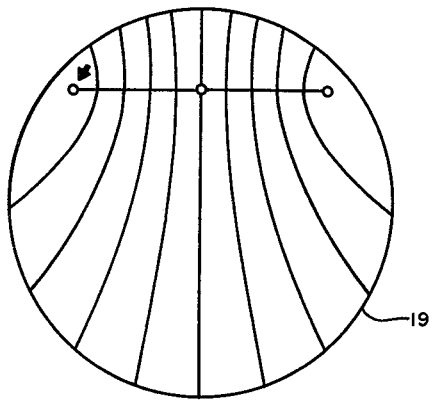
*Fig-6*
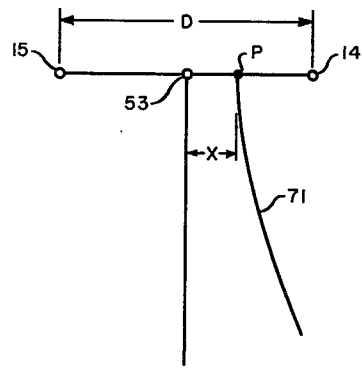
*Fig-8*
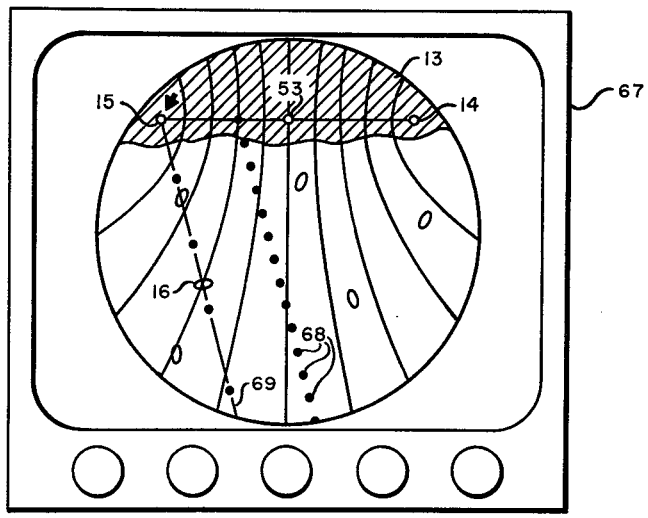
*Fig-7*
*INVENTOR.*
GUS STAVIS
BY 
ATTORNEY.

Nov. 19, 1963 G. STAVIS 3,111,663
RADAR AND TELEVISION NAVIGATION AID
Filed Nov. 7, 1960 4 Sheets-Sheet 4

INVENTOR.
GUS STAVIS

BY

ATTORNEY.

3,111,663
RADAR AND TELEVISION NAVIGATION AID
Gus Stavis, Briarcliff Manor, N.Y., assignor to General
Precision, Inc., a corporation of Delaware
Filed Nov. 7, 1960, Ser. No. 67,827
11 Claims. (Cl. 343—6)

This invention relates generally to navigation aiding systems, particularly to such systems in which a television transmitter broadcasts a signal indicative of a map, a television picture or a radar plan position indication (PPI) display for the benefit of any ship in the harbor equipped with a television receiver.

Systems have been proposed in the past which televise a radar PPI display of a harbor to ships in the area. Such systems, to be fully effective, should include some arrangement enabling an operator viewing a shipboard receiver to identify that image on the screen which represents his own ship. One such arrangement is described and claimed in the co-pending application of Roberts, Slawsky and Stavis, Serial No. 61,132, filed October 7, 1960 for Radar and Television Navigation Aid, which application is assigned to the same assignee as the instant application. The above cited application describes an arrangement which, in addition to an omnidirectional antenna televising a PPI display of the harbor, employs a narrow beam rotating directional antenna at the same location as the omnidirectional antenna which provides partial identification of one's own ship. Complete identification requires an additional rotating directional antenna installed at a location remote from the first.

Rotating directional antennas are both cumbersome and expensive, and accordingly there is a need for a system achieving the results of application Serial No. 61,132, but in which the number of directional antennas required is reduced.

It is a general object of the present invention to provide apparatus enabling a shipboard operator to view on the screen of a standard television receiver a visual representation of the objects in a harbor area and to identify unambiguously the position of his own ship on the representation.

Briefly stated, the present invention utilizes the fact that a hyperbola defines the locus of a point whose distances from two fixed points has a constant difference. In accordance with a specific embodiment of the invention, an omnidirectional antenna televises both a radar PPI display of the area and a family of hyperbolae. A rotating directional antenna at a remote location transmits a signal which generates a bearing line on the receiver screen, which line determines both the particular hyberbola intersecting the image of one's own ship and the point of such intersection.

For a clearer understanding of the invention reference may be made to the following detailed description and the accompanying drawing, in which:

FIGURE 6 is a diagram of a mask which is to be placed over the radar screen;

FIGURE 7 is a view of a television receiver and screen under one set of operating conditions;

FIGURE 8 is a diagram useful in explaining the invention;

Figure 1:
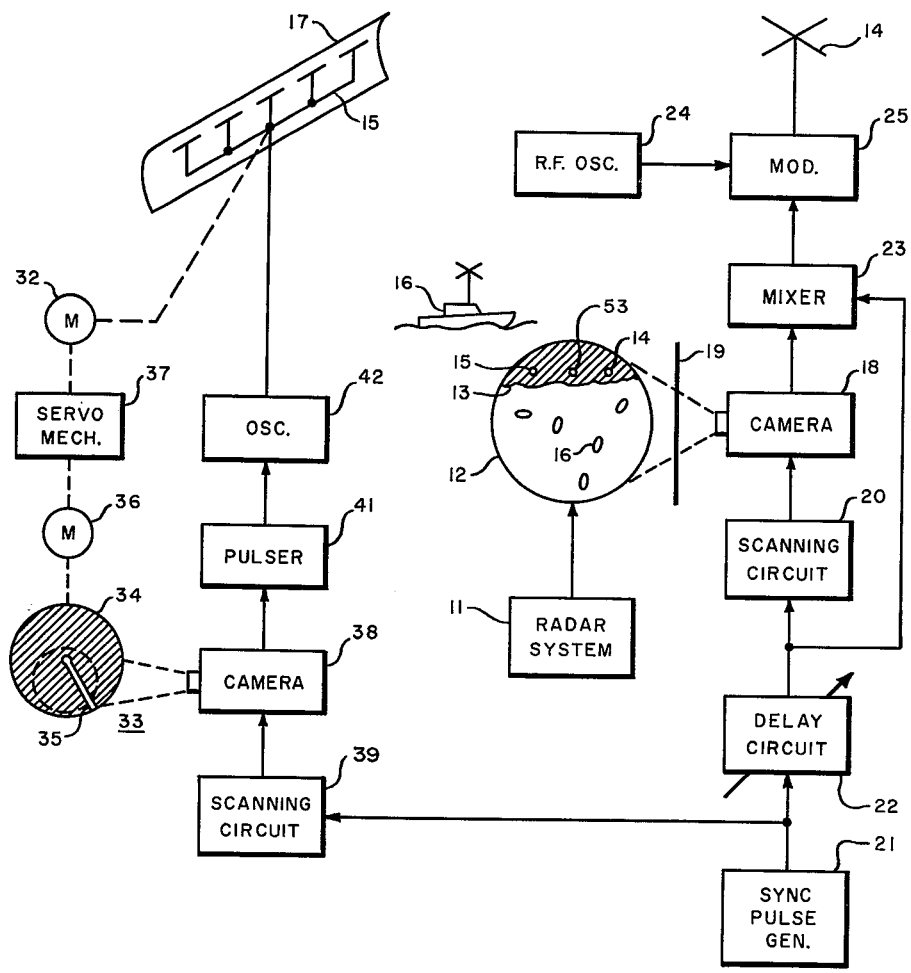
FIGURE 1 is a schematic diagram of the apparatus of the invention.

Referring first to FIGURE 1, there is shown a radar system 11 which operates in the usual manner to form a plan position indication (PPI) of a harbor area on a screen 12. This presentation shows a land mass 13, the location of two television transmitting antennas 14 and 15, and a number of ships, such as the ship 16, in various positions throughout the harbor. The screen 12 is viewed by a television camera 18 which generates a video signal indicative of the scene shown on the screen 12. In some situations the radar system 11 and screen 12 may be dispensed with, for example by substituting a map of the area or by arranging the camera 18 to view the scene directly. However, the use of the radar screen allows the moving harbor traffic to be presented and also permits operation of the system during conditions of poor visibility when it is most needed. Accordingly, the use of radar will be assumed for the purposes of description.

Interposed between the screen 12 and the camera 18 is a generally transparent mask or overlay 19, containing certain opaque markings, as will be more fully explained. The overlay 19 is shown schematically in FIGURE 1 in an edge view, although actually it is placed directly over the screen 12.

The camera 18 is angularly positioned so as to cause the images of the antennas 14 and 15 to lie on the same horizontal line, for reasons which will become apparent. The camera 18 is controlled by a scanning circuit 20 which in turn is controlled by a synchronizing pulse generator 21. The pulses from the generator 21, instead of being passed directly to the scanning circuit 20, are first passed through a delay circuit 22 for purposes which will appear subsequently. The video output from the camera 18 enters a mixing circuit 23 where synchronizing pulses are added to form a composite video signal. A radio frequency oscillator 24 provides energy at a carrier frequency which is amplitude modulated by the composite video signal in a modulator 25. The modulated signal is a television signal which is standard in all respects and is radiated by the omnidirectional antenna 14.

The apparatus so far described enables the operator of any vessel within the harbor, such as the vessel 16, to view an image of the radar screen 12 merely by equipping his vessel with a standard home entertainment variety television receiver. Such a receiver need be modified or supplemented only to the extent necessary to enable reception of the particular channel utilized as determined by the frequency of the oscillator 24.

At a location remote from the antenna 14, there is shown the directional antenna 15 which radiates a narrow beam of energy preferably five degrees or less in width. The antenna 15 may, for example, comprise a linear array of dipoles the spacing and phasing of which are selected in accordance with well known principles to generate a narrow beam, and may include a suitable reflector 17. The antenna 15 is rotated continuously at a substantially constant speed on the order of from one to twenty revolutions per minute by an electric motor 32. An indicator, designated generally by the reference character 33, is provided, the purpose of which is to represent continuously the orientation of the antenna 15. The indicator 33 comprises an opaque disc 34 one side of which is completely covered with a black, nonreflected coating except for a radial white line 35, and is rotated by an electric motor 36 in synchronism with the rotation of the antenna 15. The synchronizing mechanism could comprise a direct mechanical connection but is shown schematically in FIGURE 1 as a servo mechanism 37 which may, for example, comprise an arrangement of synchro control transformers, synchro transmitters, and servo amplifiers or any other suitable arrangement to cause the motors 32 and 36 to rotate in synchronism.

A television camera 38 is mounted to view the indicator 33 and is positioned to make the center of rotation appear at the proper location within the field of view, as will be more fully explained. The camera 38 is controlled by a scanning circuit 39 which in turn is controlled by the synchronizing pulse generator 21. The video signal from the camera 38 controls a pulse generating circuit, or pulser 41 which generates a pulse whenever a video signal from the camera 38 appears. The pulser 41 in turn controls a radio frequency oscillator 42 which generates oscillations during, and only during, the application of pulses from the pulser 41. It may control the generation of oscillations directly or may control a gate in the output circuit.

The antennas 14 and 15 are necessarily widely separated, perhaps by a distance of on the order of five or ten miles. Since the intelligence radiated by both antennas is timed and otherwise controlled by the same synchronizing pulse generator 21, a connection such as a land line is required between stations. It would be possible to locate the antenna 15 only at the remote point and to install the remainder of the apparatus shown at the left portion of FIGURE 1 near the antenna 14 in which case the land line would carry the radio frequency signal from the oscillator 42 to the antenna 15. It would also be possible to install all of the equipment shown at the left of FIGURE 1 at the remote point in which case the land line would carry the pulses from the synchronizing pulse generator 21 to the scanning circuit 39. Other arrangements of the physical location of the components are also possible. In any event, the land line or other link introduces delay and it is the purpose of the delay circuit 22 to introduce a like delay to the circuits feeding the antenna 14. The delay introduced by the circuit 22 is matched to that of the land line so that the antenna 15 radiates the signal representing the beginning of the first horizontal line scanned by the camera 38 at the same time that the antenna 14 is radiating the signal representing the beginning of the first horizontal line scanned by the camera 18.

The oscillators 24 and 42 operate at nearly, but not quite, the same frequency. The two frequencies should be close enough to each other so that the shipboard receiver may receive signals from either station without retuning, yet spaced enough from each other to preclude extended periods of either in-phase or out-of-phase operation. One satisfactory arrangement is to control each oscillator by its own crystal, the two crystals having the same nominal frequency. The inherent frequency difference between two ordinary stock crystals is of the proper magnitude to provide satisfactory operation.

In operation, when the antenna 15 is not directed toward the ship 16, the PPI image is reproduced by the shipboard receiver. For understanding of the operation when the antenna 15 is directed toward the ship 16, it is helpful to consider separately various portions of each horizontal scanning line of the camera 38. When the electron beam of the camera 38 is not traversing the image of the line 35, the antenna 15 does not radiate and so has no effect. The PPI image is reproduced without hindrance. When the electron beam of the camera 38 traverses the image of the line 35, the oscillator 42 energizes the antenna 15 which radiates radio frequency energy. At the same time, the antenna 14 radiates radio frequency energy, the instantaneous amplitude of which may be high or low depending upon the intensity of that portion of the PPI image then being scanned by the camera 18. The electromagnetic field in the vicinity of the ship 16 will be the resultant of the fields caused by radiation of the antennas 14 and 15 and may be either greater or less than that caused by the antenna 14 alone, depending upon whether the contribution of the antenna 15 is instantaneously in phase or out of phase with that from the antenna 14. If the contributions are in phase, the voltage induced in the receiving antenna will be greater, causing the screen to be darkened at that point. If the contributions are out of phase, the induced voltage will be less, causing the screen to become brighter. Since the frequencies are different, the relative phases change continuously and at some times the phases are such as to cause substantially complete cancellation and resulting brightening of the screen. Such cancellation will not, in general, occur during each horizontal scan line, but will occur at least once every few scan lines. The result is the production of a series of aligned bright spots on the screen of the shipboard receiver. These spots lie on a straight line representing the instantaneous angular position of the white line 35 and, of course, the orientation of the antenna 15. It is noted that there is no interruption in the reproduction of the PPI image except when the antenna 15 is directed toward the ship 16 and, in addition, when the camera 38 is actually scanning the line 35. The location of the line of bright spots on the receiver screen depends upon the location of the ship, as explained below.

FIGURES 2, 3, 4 and 5 are partial views of the receiver screen under various conditions. In each figure there are shown the locations of the antennas 14 and 15, and, additionally, there is shown a dashed horizontal line 51 representing an imaginary line joining the locations of the antennas 14 and 15. The dashed line 52, intersecting the line 51 at the point 53, is the perpendicular bisector of the line 51 and, thus, is the locus of points equidistant from the points 14 and 15.

Returning to FIGURE 1 for a moment, the camera 38 is positioned with respect to the indicator 33 so that the center of rotation of the line 35 occupies the same position on the field of view of the camera 38 that the point 53 occupies on the field of view of the camera 18. The field of view of the camera 38 is shown approximately by the dashed line circle in FIGURE 1 for the particular locations assumed for the antennas 14 and 15.

Figure 2:
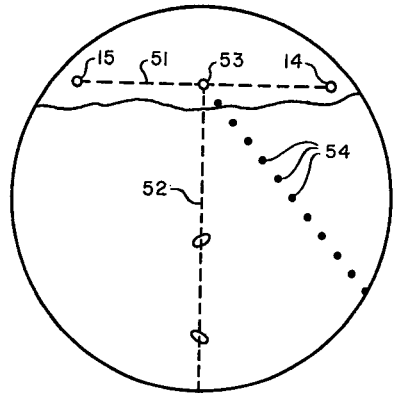
FIGURES 2, 3, 4 and 5 are partial diagrams of the screen of a receiver under various conditions.
Figure 3:
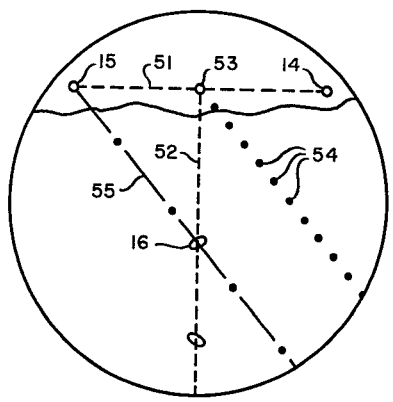

In FIGURE 2 the ship 16 carrying the receiver is assumed to be on the line 52 and, therefore, equidistant from the antennas 14 and 15. It will be recalled that the delay in the land line and the characteristics of the delay circuit 22 are coordinated so that the antenna 14 and the antenna 15 emit that portion of their respective signals corresponding to the beginning of each horizontal scan line at exactly the same time. The scanning circuits of the receiver are controlled by the signal from the antenna 14 and since the receiver is equidistant from the two antennas, signals representing corresponding positions of each scan line arrive at the same time. The result is that the center of rotation of the line 35 (FIGURE 1) is displayed on the receiver superimposed upon the point 53, and a line of bright spots 54 emanating from the point 53 appears on the screen.

Had the camera 38 been so positioned as to place the center of rotation of the line 35 on that portion of the field of view corresponding to the position of the point 15 on the field of view of the camera 18, it is obvious that a line of bright spots would have appeared on the receiver screen starting from the point 15 and passing through the ship 16 carrying the receiver. The effect of positioning the camera 38 to superimpose the center of rotation of line 35 and the point 53 is merely a translation effect and accordingly the line of bright spots 54 emanating from the point 53 is parallel to a line connecting the point 15 with the ship 16. Therefore, a shipboard operator may positively identify the blip representing his own ship by drawing a line, or placing a straight edge, on the screen parallel to the line of spots 54 and passing through the point 15 whereupon such line will intersect the blip representing his ship. Such a line is shown at 55 in FIGURE 3 positively identifying the blip representing the ship 16 as that blip lying on the intersection of lines 52 and 55.

Figure 4:
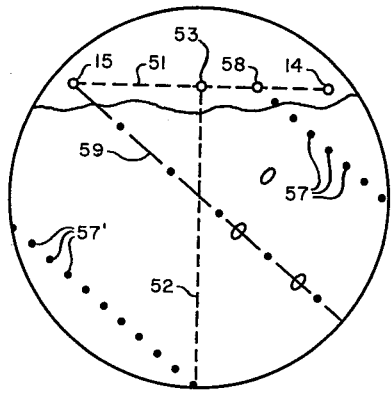
Figure 5:
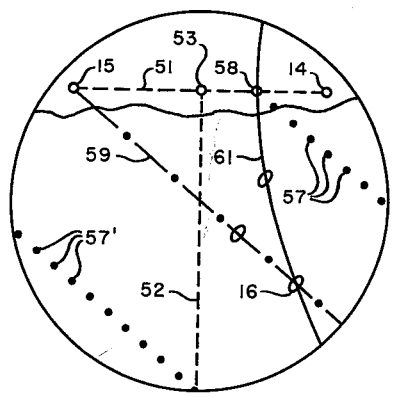

FIGURE 4 illustrates the more general case in which the ship carrying the receiver instead of being equidistant from antennas 14 and 15, is nearer to the antenna 14. The scanning circuits of the receiver are controlled by the signal from the antenna 14 and since the distance to antenna 15 is greater, the signal representing the beginning of any horizontal line of camera 38 will not arrive at the receiver until that line has been partially traced, with the result that all points of the image from the camera 38 are shifted to the right. Accordingly, although a line of bright spots 57 will appear, such line emanates not from point 53 but from point 58 to the right thereof on the horizontal line 51. A portion of the line of spots 57 appears at the upper right of the screen, the remainder, designated 57', appearing at the lower left. A line 59 is again drawn through the point 15 parallel to the line 57 thereby partially identifying one's own ship as lying on the line so drawn. Identification is completed by utilizing the fact that the distance from point 53 to point 58 is a measure of the difference in the distances from ship 16 to antennas 14 and 15. The locus of a point whose distances to two fixed points have a constant difference is a hyperbola, and, if the scale factors are properly chosen, as will be more fully explained, the ship 16 lies on that hyperbola whose vertex is at the point 58 and whose foci are at the points 14 and 15. That hyperbola is shown at 61 of FIGURE 5, along with the translated line 59, the two intersecting each other at the location of the ship 16.

The invention as so far described can be utilized conveniently by broadcasting over the antenna 14 a family of hyperbolae. This is readily accomplished by inscribing on the mask or overlay 19 the locations of the points 14, 15 and 53 and a family of hyperbolae whose foci are at points 14 and 15, as shown in FIGURE 6. Additionally it is helpful to include a small arrow pointing out the location of antenna 15 to aid the operator in translating the line of bright spots to its proper location.

FIGURE 7 shows a television receiver 67 assumed to be installed on the ship 16. The screen displays the PPI of the radar system including the land mass 13, shown cross hatched, and various ships throughout the harbor area. Also shown is the representation of the overlay 19 of FIGURE 6, including the location of the antennas 14 and 15, their midpoint 53, the arrow pointing out the location of the antenna 15, and a family of hyperbolae. The ship 16 is assumed to be nearer to the antenna 15 than to antenna 14 and accordingly the line of bright spots 68 emanates from a point to the left of the point 53. One's own ship is identified by drawing a line 69 through the point 15 parallel to the line 68 and noting its intersection with that hyperbola containing the origin of the line of spots 68.

The description of the operation of the invention as above described in connection with FIGURES 4–7 tacitly assumes that there is a preselected relationship between the width of the radar scene viewed by the camera 18 and the horizontal scanning rate of the two television cameras. In other words, FIGURES 4–7 depict a special case. While the invention is by no means limited to this special case, it has been described first because it is understood more readily. The particular relationships involved in both the general and special cases will now be considered.

Referring now to FIGURE 8, there are shown the locations 14 and 15 of the two antennas, assumed to be D miles apart, and the location 53 of the midpoint between them. It is assumed that the positioning of the cameras and the timing of the scanning circuits are adjusted, as before, so that if the ship carrying the receiver be located equidistant from antennas 14 and 15, the line of light spots will originate at the point 53. Consider now the location of the origin of the light spots if the ship be located at point P, $x$ miles from point 53. The distance from point P to point 14 is $D/2-x$ miles and the distance from point P to point 15 is $D/2+x$ miles. The difference between these distances is therefore $2x$ miles and a radio signal transmitted from point 15 will not arrive at point P until $2x/c$ microseconds after the arrival of a signal transmitted at the same time from point 14, where $c$ is the velocity of propagation in miles per microsecond. The scanning circuits of the receiver are controlled by the signal from the point 14 and accordingly the line of bright spots will originate at a point displaced to the right of the point 53 a distance equal to the distance travelled by the electron scanning beam of the receiver in $2x/c$ microseconds. If T be the time in microseconds required for the electron beam to travel completely across the screen from left to right and if W be the width in inches of the receiver screen, the origin of the line of spots will be displaced to the right of point 53 by a distance $\delta_1$ of $$\frac{2x}{c}\frac{W}{T}$$

inches. The origin of the line of spots will also be displaced $$\frac{2x}{c}\frac{W}{T}$$

inches for a ship at any position which is $2x$ miles nearer to point 14 than to point 15 and the locus of such positions is the hyperbola 71 whose vertex is at point P and whose foci are at points 14 and 15.

Still considering the situation depicted in FIGURE 8 wherein the ship is located at point P, $x$ miles from point 53, let us determine the position of the image of the ship on the receiver screen. The image is of course the blip on the radar screen viewed by the camera 18 and transmitted over the antenna 14. If the total width of the scene viewed by the camera 18 is M miles, the blip will appear on the screen of the receiver displaced to the right of the point 53 a distance $\delta_2$ of $$\frac{x}{M}W$$

inches. In the special case depicted by FIGURES 4–7, it was assumed that $\delta_1=\delta_2$, that is, that $$\frac{2x}{c}\frac{W}{T}=\frac{x}{M}W$$

from which $M=\frac{1}{2}cT$. The velocity of propagation, $c$, is of course 0.186 mile per microsecond and in standard commercial television practice T is approximately 53.5 microseconds. Substituting these values in the above equation it is found that the situation depicted in FIGURES 4–7 can obtain only if the scene width, M, is 4.97, or, approximately, 5 miles. This is a physically realizable case which may fit many situations, but the invention is equally applicable to situations utilizing other scene widths.

Figure 9:
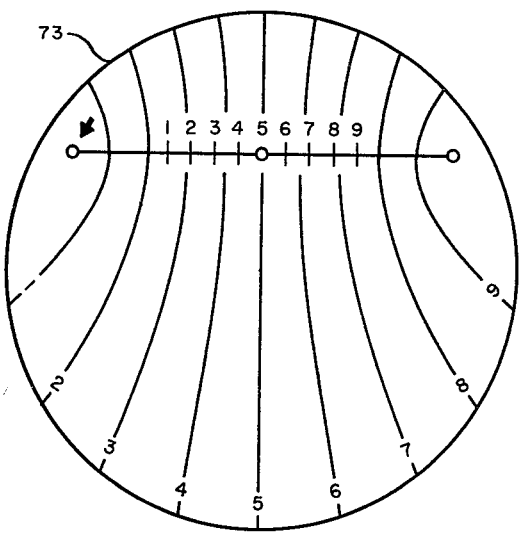
FIGURE 9 is a diagram of another mask to be placed over the radar screen.

The invention may utilize any scene width simply by replacing the overlay 19 of FIGURES 1 and 6 with an overlay 73 such as shown in FIGURE 9. The markings include the locations of the two transmitters, the midpoint between them, an arrow pointing out the location of the transmitter 15, and a family of hyperbolae each marked with an identification number. Also included is a horizontal row of marks with numbers corresponding to the numbers of the hyperbolae. These marks constitute a scale which measures the lateral displacement of the origin of the line of light spots and associates such displacement with a particular hyperbolic line of position.

The scale marks are located on the overlay 73 in accordance with the equations previously discussed. It will be recalled that the lateral displacement of the line of spots, $\delta_1$, $$=\frac{2x}{c}\frac{W}{T}$$

while the displacement of the radar image of the ship, $\delta_2$, $$=\frac{x}{M}W$$

from which $$\delta_1 = \frac{2M}{cT}\delta_2$$

or, substituting the previously given values for $c$ and $T$, $$\delta_1 = \frac{M}{5}\delta_2$$

To construct the overlay, a family of hyperbolae is drawn with any convenient spacing between individual hyperbolae, preferably having uniformly spaced vertexes along the line joining points 14 and 15. The displacement of corresponding scale marks is obtained from the above relationship of $\delta_1$, $\delta_2$ and M. For example, if the scene width, M, is 3 miles, $\delta_1 = \frac{3}{5}\delta_2$, and the scale marks are displaced from the midpoint by 3/5 of the displacement of the corresponding hyperbolae. This is the example illustrated in FIGURE 9.

Figure 10:
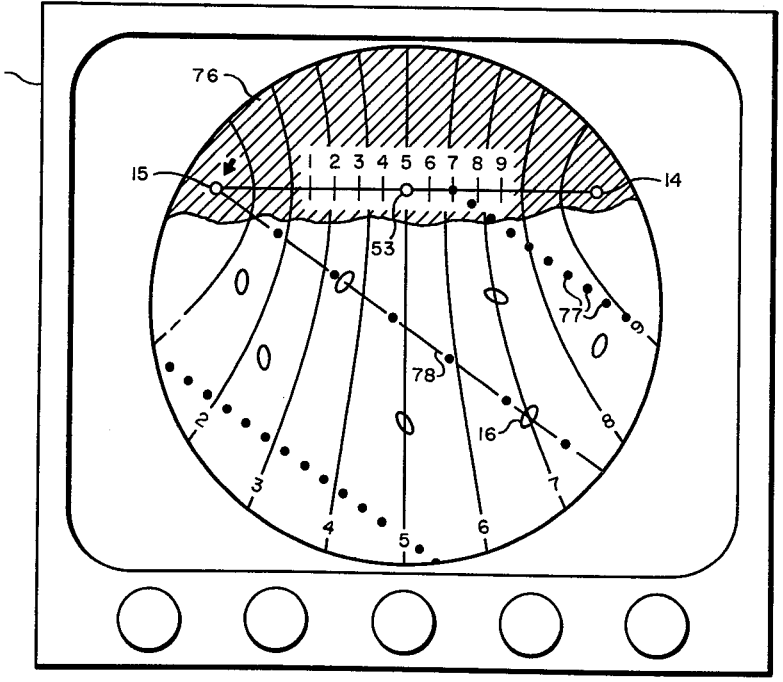
FIGURE 10 is a view of a television receiver and screen under another set of operating conditions.

FIGURE 10 shows a television receiver 75 assumed to be installed on the ship 16 located in an area served by a system in which the scene width is 3 miles, as discussed in connection with FIGURE 9. There can be seen all of the markings on the overlay 73, the land mass 76 on which the antennas 14 and 15 are located, and a number of radar blips representing ships in the harbor. Also visible is a line of bright spots 77 emanating from the scale mark No. 7, continuing to the right edge of the screen and reappearing at the lower left. The operator's own ship is now known to lie somewhere on the No. 7 hyperbola. Identification is completed by drawing a line or placing a straight edge on the screen parallel to the line 77 and passing through the point 15. Such a line is shown as the dot and dash line 78 which intersects the hyperbola No. 7 at the location of the operator's own ship 16.

It is obvious that a scene width greater than five miles can be accommodated by providing a suitable overlay in accordance with the principles given above, in which case the displacement of the horizontal scale marks will be greater than the displacement of the corresponding hyperbolae. It is also obvious that one's own ship may be identified when the blip, instead of lying directly on one hyperbola, lies between two hyperbolae. The line of bright spots will then emanate from a point between two horizontal scale marks but the translated line, such as the line 78 of FIGURE 10, will always intersect the blip representing one's own ship.

Although a specific embodiment has been described, many modifications may be made within the spirit of the invention. It is therefore desired that the protection afforded by Letters Patent be limited only by the true scope of the appended claims.

What is claimed is:

1. A navigation aid, comprising, an omnidirectional antenna at a first location, a continuously rotating directional antenna at a second location, a visual representation of a family of hyperbolae having foci at said first and second locations, means for broadcasting over said omnidirectional antenna a television signal indicative of an area of operations with said visual representation superimposed thereon, and means for radiating from said directional antenna a signal indicative of the orientation of said directional antenna.

2. A navigation aid, comprising, an omnidirectional antenna at a first location, a continuously rotating directional antenna at a second location, a radar system for generating a first visual representation of the fixed and moving objects within an area of operations, a second visual representation of a family of hyperbolae having foci at said first and second locations, means for broadcasting over said omnidirectional antenna a television signal indicative of said first visual representation with said second visual representation superimposed thereon, and means for radiating from said directional antenna a signal indicative of the orientation of said directional antenna.

3. A navigation aid, comprising, an omnidirectional antenna at a first location, a continuously rotating directional antenna at a second location, a radar system for generating a first visual representation of the fixed and moving objects within an area of operations, a second visual representation of a family of hyperbolae having foci at said first and second locations, means for broadcasting over said omnidirectional antenna a television signal indicative of said first visual representation with said second visual representation superimposed thereon, an indicator rotating in synchronism with said directional antenna, a television camera positioned to view said indicator, and an oscillator controlled by the video signal output of said camera for energizing said directional antenna.

4. A navigation aid, comprising, an omnidirectional antenna at a first location, a continuously rotating directional antenna at a second location, a first television camera for viewing a scene representing an area of operations, a transparent mask positioned between said camera and said scene, said mask being inscribed with opaque hyperbolae the foci of which are at points corresponding to the locations of said first and second antennas, means including said first television camera for broadcasting over said omnidirectional antenna a television signal indicative of the scene viewed by said first camera, an indicator for representing continuously the orientation of said directional antenna, said indicator comprising a line rotating on a background of contrasting brightness, a second television camera positioned to view said indicator, whereby the video output of said second camera is a series of pulses occurring when said second camera scans said line, and means for radiating a radio frequency signal from said directional antenna during and only during the occurrence of said pulses.

5. A navigation aid comprising, an omnidirectional antenna at a first location, a continuously rotating directional antenna at a second location, a radar system including a viewing screen for generating a visual representation of the fixed and moving objects within an area of operations including said first and second locations, a transparent sheet placed over said screen and inscribed with opaque hyperbolae the foci of which are at the locations of said antennas as represented on said screen, means including a first television camera for broadcasting over said omnidirectional antenna a television signal indicative of said visual representation with said hyperbolae superimposed thereon, and indicator for representing continuously the orientation of said directional antenna, said indicator comprising a line rotating on a background of contrasting brightness, a second television camera positioned to view said indicator, whereby the video output of said second camera is a series of pulses occurring when said second camera scans said line, and means for radiating a radio frequency signal from said directional antenna during and only during the occurrence of said pulses.

6. A navigation aid, comprising, an omnidirectional antenna at a first location, a continuously rotating directional antenna at a second location, a radar system including a viewing screen for generating a visual representation of the fixed and moving objects within an area of operations including said first and second locations, a transparent sheet placed over said screen and inscribed with opaque hyperbolae the foci of which are at the locations of said antennas as represented on said screen, a first television camera for viewing said visual representation with said sheet overlying said representation, said first camera being angularly positioned to make the representations of the locations of said antennas lie on the same horizontal scan line of said camera, means including said camera for broadcasting over said omnidirectional antenna a television signal indicative of the scene viewed by said camera, an indicator for representing continuously the orientation of said directional antenna, said indicator comprising a line rotating on a background of contrasting brightness, a second television camera positioned to view said indicator, whereby the video output of said second camera is a series of pulses occurring when said second camera scans said line, means for synchronizing the scanning operation of said first and second cameras, and means for radiating a radio frequency signal from said directional antenna during and only during the occurrence of said pulses.

7. A navigation aid, comprising, an omnidirectional antenna at a first location, a continuously rotating directional antenna at a second location, a radar system including a viewing screen for generating a visual representation of the fixed and moving objects within an area of operations including said first and second locations, a transparent sheet placed over said screen and inscribed with opaque hyperbolae the foci of which are at the locations of said antennas as represented on said screen, a first radio frequency oscillator for energizing said omnidirectional antenna, means including a first television camera for modulating the output of said oscillator with a video signal indicative of said visual representation with said hyperbolae superimposed thereon, an indicator for representing continuously the orientation of said directional antenna, said indicator comprising a line rotating on a background of contrasting brightness, a second television camera positioned to view said indicator, whereby the video output of said second camera is a series of pulses occurring when said second camera scans said line, a second radio frequency oscillator for energizing said directional antenna, said second oscillator operating at substantially the same frequency as but asynchronously with said first oscillator, and means for causing said second oscillator to energize said directional antenna during and only during the occurrence of said pulses.

8. A navigation aid comprising, an omnidirectional antenna at a first location, a continuously rotating directional antenna at a second location, a radar system including a viewing screen for generating a visual representation of the fixed and moving objects within an area of operations including said first and second locations, a transparent mask placed over said screen and inscribed with opaque hyperbolae the foci of which are at the locations of said antennas as represented on said screen, a first television camera for viewing said visual representation with said mask overlying said representation, said first camera being angularly positioned to make the representations of the locations of said antennas lie on the same horizontal scan line of said first camera, a synchronizing pulse generator, means for controlling the scanning operation of said first camera by the output of said pulse generator, a first radio frequency oscillator for energizing said omnidirectional antenna, means for modulating said oscillator with the video output of said camera and with the synchronizing pulses from said pulse generator, an indicator for representing continuously the orientation of said directional antenna, said indicator comprising a line rotating on a background of contrasting brightness, a second television camera positioned to view said indicator, whereby the video output of said second camera is a series of pulses occurring when said second camera scans said line, said second camera being angularly positioned to cause the center of rotation of said line to occupy the same position on the field of view of said second camera as the mid-point between said antennas occupies on the field of view of said first camera, means for controlling the scanning operation of said second camera in accordance with the output of said synchronizing pulse generator, a second radio frequency oscillator for energizing said directional antenna, said second oscillator operating at substantially the same frequency as but asynchronously with said first oscillator, and means for causing said second oscillator to energize said directional antenna during and only during the occurrence of video output pulses from said second camera.

9. A navigation aid, comprising, an omnidirectional antenna at a first location, a continuously rotating directional antenna at a second location, a radar system including a viewing screen for generating a visual representation of the fixed and moving objects within an area of operation including said first and second locations, a transparent mask placed over said screen, a first television camera for viewing said mask and said screen, said camera being positioned to make the representations of both of said antenna locations lie on the same horizontal scan line of said camera, said transparent mask being inscribed with opaque marks in the form of a family of hyperbolae the foci of which are at the locations of said antennas as represented on said screen, said mask also being inscribed with opaque scale marks, one for each hyperbola, lying on the line joining the representations of the locations of said antennas, each of said scale marks being displaced from the center of said line by a distance equal to twice the displacement of the vertex of its corresponding hyperbola times the width of the portion of the scene depicted on said screen which is viewed by said camera divided by the product of the velocity of light and the time required for said camera to scan one horizontal line, means including said first camera for broadcasting over said omnidirectional antenna a television signal indicative of the scene viewed by said first camera, an indicator for representing continuously the orientation of said directional antenna, said indicator comprising a line rotating on a background of contrasting brightness, a second television camera positioned to view said indicator, whereby the video output of said second camera is a series of pulses occurring when said second camera scans said line, and means for radiating radio frequency energy from said directional antenna during and only during the occurrence of said pulses.

10. A navigation aid, comprising, an omnidirectional antenna at a first location, a continuously rotating directional antenna at a second location, a radar system including a viewing screen for generating a visual representation of the fixed and moving objects within an area of operations including said first and second locations, a transparent mask placed over said screen, a first television camera for viewing said mask and said screen, said camera being positioned to make the representations of both of said antenna locations lie on the same horizontal scan line of said camera, said transparent mask being inscribed with opaque marks in the form of a family of hyperbolae the foci of which are at the locations of said antennas as represented on said screen, said mask also being inscribed with opaque scale marks, one for each hyperbola, lying on the line joining the representations of the locations of said antennas, each of said scale marks being displaced from the center of said line by a distance $\delta_1$ satisfying the equation $$\delta_1 = \frac{2M}{cT}\delta_2$$

where

M is the width of that portion of the scene depicted by the radar screen which is viewed by said camera,
c is the velocity of light,
T is the time required for the scanning beam of the camera to travel across the screen from left to right,
$\delta_2$ is the displacement of the vertex of the corresponding hyperbola from the center of said line, means including said first camera for broadcasting over said omnidirectional antenna a television signal indicative of the scene viewed by said first camera, an indicator for representing continuously the orientation of said directional antenna, said indicator comprising a line rotating on a background of contrasting brightness, a second television camera positioned to view said indicator, whereby the video output of said second camera is a series of pulses occurring when said second camera scans said line, and means for radiating radio frequency energy from said directional antenna during and only during the occurrence of said pulses.

11. A navigation aid, comprising, an omnidirectional antenna at a first location, a continuously rotating directional antenna at a second location, a radar system including a viewing screen for generating a visual representation of the fixed and moving objects within an area of operations including said first and second locations, a transparent mask placed over said screen and inscribed with opaque hyperbolae the foci of which are at said first and second locations as represented on said screen, a first television camera for viewing said screen and said mask, said first camera being angularly positioned to make the representations of said first and second locations lie on the same horizontal scan line, said first camera also being positioned and adjusted to make said camera view a portion of said screen which represents a distance equal to one half the product of the velocity of light and the time required to scan one horizontal line, means including said first camera for broadcasting over said omnidirectional antenna a television signal indicative of the scene viewed by said camera, an indicator for representing continuously the orientation of said directional antenna, said indicator comprising a line rotating on a background of contrasting brightness, a second television camera positioned to view said indicator, whereby the video output of said second camera is a series of pulses occurring when said second camera scans said line, and means for radiating a radio frequency signal from said directional antenna during and only during the occurrence of said pulses.

References Cited in the file of this patent
UNITED STATES PATENTS

| | | |
|---|---|---|
| 2,528,202 | Wolff | Oct. 31, 1950 |
| 2,855,595 | Koeppel | Oct. 7, 1958 |

FOREIGN PATENTS

| | | |
|---|---|---|
| 823,406 | Great Britain | Nov. 11, 1959 |